(12) United States Patent
Steinke

(10) Patent No.: US 8,226,320 B2
(45) Date of Patent: Jul. 24, 2012

(54) BOLTED JOINT

(75) Inventor: Uwe Steinke, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 490 days.

(21) Appl. No.: 12/223,955

(22) PCT Filed: Mar. 16, 2007

(86) PCT No.: PCT/EP2007/052525
§ 371 (c)(1),
(2), (4) Date: Sep. 22, 2008

(87) PCT Pub. No.: WO2007/107520
PCT Pub. Date: Sep. 27, 2007

(65) Prior Publication Data
US 2009/0028634 A1   Jan. 29, 2009

(30) Foreign Application Priority Data

Mar. 22, 2006 (DE) .......................... 10 2006 013 068
Dec. 9, 2006 (DE) .......................... 10 2006 058 140

(51) Int. Cl.
*B25G 3/20* (2006.01)
(52) U.S. Cl. ..................................... 403/371; 403/408.1
(58) Field of Classification Search ................... 403/11, 403/21, 22, 195, 222, 370, 371, 374.4, 409.1; 411/57.1, 58, 59, 60.1, 60.2, 87, 88, 90–100, 411/102, 116–121; 415/209.2
See application file for complete search history.

(56) References Cited

U.S. PATENT DOCUMENTS

| | | | | |
|---|---|---|---|---|
| 1,585,532 A * | 5/1926 | Cole et al. | ...................... | 403/217 |
| 1,823,428 A * | 9/1931 | Hill | .............................. | 411/80.1 |
| 2,010,451 A * | 8/1935 | Browning | ..................... | 403/358 |
| 2,052,793 A * | 9/1936 | Peirce | ........................... | 411/60.1 |
| 2,203,178 A * | 6/1940 | Peirce | ............................. | 411/38 |
| 2,321,170 A * | 6/1943 | Wallace | ........................ | 411/60.1 |
| 3,355,201 A * | 11/1967 | Barwick | ................... | 403/374.4 |
| 3,584,473 A * | 6/1971 | MacDonald et al. | ........... | 464/90 |
| 3,603,626 A * | 9/1971 | Whiteside | ................... | 403/408.1 |
| 3,662,783 A * | 5/1972 | Stacey | .................... | 137/596.14 |
| 4,048,898 A * | 9/1977 | Salter | ............................... | 411/44 |
| 4,065,077 A * | 12/1977 | Brooks | .......................... | 244/54 |

(Continued)

FOREIGN PATENT DOCUMENTS

DE    1798003    10/1959

(Continued)

*Primary Examiner* — Michael P Ferguson
*Assistant Examiner* — Daniel Wiley
(74) *Attorney, Agent, or Firm* — Greer, Burns & Crain, Ltd.

(57) ABSTRACT

A bolted joint for connecting structural parts established by at least two bolt eyes formed in each part. Two conically configured bolts are each surrounded by a slotted sleeve having a conical inner surface and a cylindrical outer surface. A thin end of each bolt has a threaded journal and a thick end has a spanner lug. Slotted eccentric bushings are inserted into the bolt eyes, which each receive a slotted sleeve and a bolt. Each threaded journal interacts with a nut so when the nut is tightened, a radial force is exerted by the sleeve upon the bolt eyes. The sleeves each have a rim with two diametrically opposing, mutually parallel flattenings. The sleeves are secured against twisting by an anti-twist protection which is formed of two rings, connected to each other via a web. The rings have bearing edges which interact positively with the flattenings.

4 Claims, 2 Drawing Sheets

U.S. PATENT DOCUMENTS

| | | | | |
|---|---|---|---|---|
| 4,555,199 A | * | 11/1985 | Maier et al. | 403/370 |
| 4,796,349 A | * | 1/1989 | Miller | 29/402.08 |
| 4,911,417 A | * | 3/1990 | Short | 267/256 |
| 5,190,393 A | * | 3/1993 | Svensson | 403/370 |
| 5,211,537 A | * | 5/1993 | Langston et al. | 415/209.2 |
| 5,521,951 A | * | 5/1996 | Charnley et al. | 376/260 |
| 5,775,831 A | * | 7/1998 | Mullenberg | 403/337 |
| 5,803,686 A | * | 9/1998 | Erbes et al. | 411/55 |
| 5,905,771 A | * | 5/1999 | Erbes et al. | 376/302 |
| H1981 H | * | 8/2001 | Hennick | 411/87 |
| 6,450,746 B1 | * | 9/2002 | Kirimoto | 411/95 |
| 6,974,275 B2 | * | 12/2005 | Nago et al. | 403/21 |
| 7,037,027 B2 | * | 5/2006 | Steinbeck | 403/408.1 |
| 2003/0108398 A1 | * | 6/2003 | Sathianathan | 411/60.1 |
| 2005/0262682 A1 | * | 12/2005 | Grover et al. | 29/428 |

FOREIGN PATENT DOCUMENTS

| | | |
|---|---|---|
| FR | 2574135 | 6/1986 |
| GB | 811993 | 4/1959 |

* cited by examiner

Fig. 3
Fig. 4
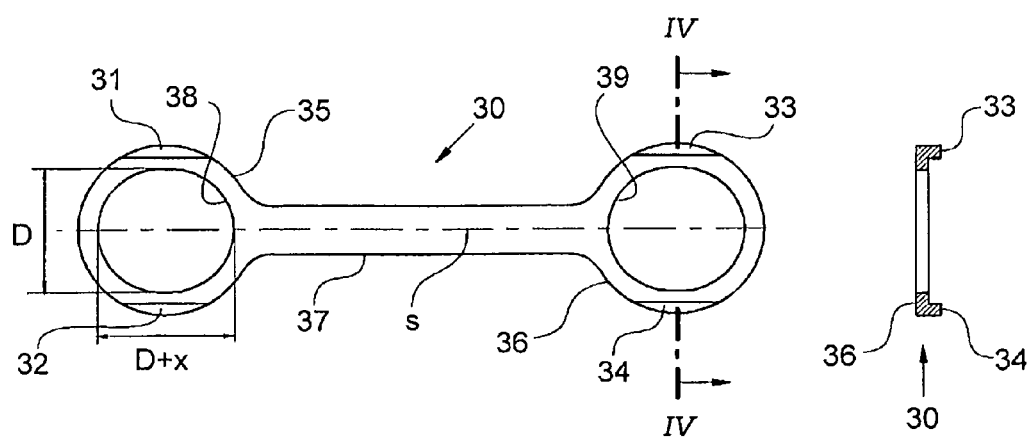
Fig. 5
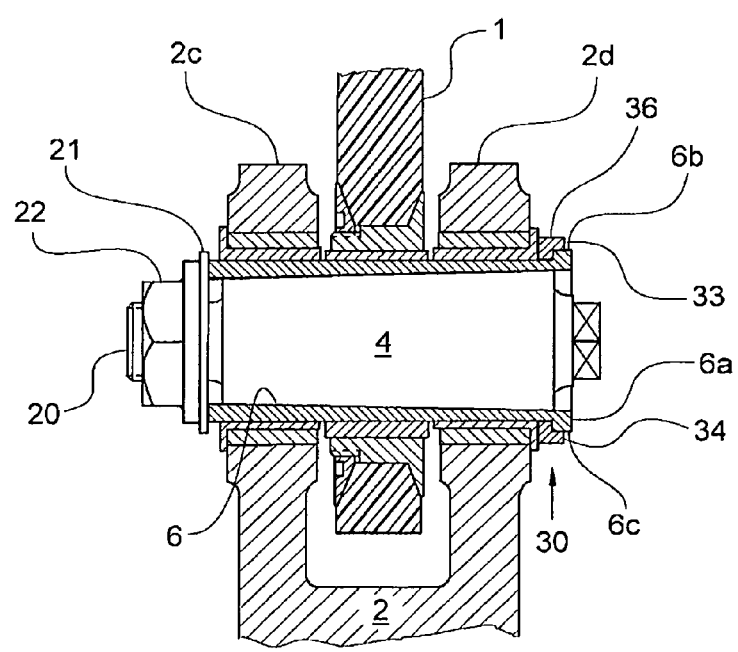

BOLTED JOINT

FIELD OF THE INVENTION

The invention relates to a bolted joint for connecting load-transferring structural parts, for example on an aircraft.

BACKGROUND OF THE INVENTION

Such joints are generally of double-shear configuration, a first structural part having a bolt eye being connected by means of a bolt to a second structural part having a fork. In this case, the bolt is conically configured and is surrounded by a slotted sleeve with conical inner surface and cylindrical outer surface and has at its thin end a threaded journal and at its thick end a spanner lug, the threaded journal interacting with a nut in such a way that, when the nut is tightened, a radial force is exerted by the sleeve upon the bolt eyes. For design reasons, it can sometimes be necessary to dispose, for instance, two bolted joints directly adjacent to each other in such a way that the first structural part has two bolt eyes integrally connected to each other and the second structural part has two forks integrally connected to each other. For an optimal load transfer, it is always necessary in high-grade bolted joints for the fits between bolts and bolt eyes to be adhered to as closely as possible.

In a bolted joint having a plurality of bolts, an offset of the bores for receiving the bolts is obtained if their spacing on the two structural parts is not consistent. In order to avoid this, it is customary for the structural parts to be connected to be jointly bored during the assembly. The effect of this measure is that the particular bores are made without offset and at the same time acquire their true-fitting finished size. This is not practicable, however, if a joint boring of the structural parts during the assembly is not possible due to the size of the structural parts or for procedural reasons.

SUMMARY OF THE INVENTION

An object of the present invention is to configure a bolted joint having a plurality of bolts such that the bores for the establishment of the individual bolted joints acquire their finished size prior to the assembly and compensation is provided for a possible offset of the bores during the assembly.

This object is achieved by a bolted joint for connecting load-transferring structural parts, the bolted joint being established by at least two bolts and the bolts being conically configured and being respectively surrounded by a slotted sleeve with conical inner surface and cylindrical outer surface and having respectively at their thin end a threaded journal and at their thick end a spanner lug, and each threaded journal interacting with a nut in such a way that, when the nut is tightened, a radial force is exerted by the sleeve upon the bolt eyes, wherein slotted eccentric bushings are inserted into the finished-size bores of the bolt eyes, which bores respectively receive a bolt, and are adjustable by rotation such that the axes of their inner bores coincide, so that the bolt is insertable which establishes the joint, wherein the sleeves are secured against twisting by an anti-twist protection, wherein the anti-twist protection comprises two rings, which are connected to each other via a web, the rings having bearing edges which interact positively with flattenings disposed on the side of the sleeves.

Accordingly, in a bolted joint having a plurality of bolts, slotted eccentric bushings are inserted into the finished-size bores of the bolt eyes, which bores respectively receive a bolt, and are adjustable by rotation such that the axes of their inner bores coincide, so that the bolt is insertable which establishes the joint.

As a result, an optimal work flow during the assembly is achieved.

BRIEF DESCRIPTION OF THE DRAWINGS

The present invention is explained in more detail below using preferred exemplary embodiments and with reference to the attached figures of the drawings, in which:

FIG. 3 shows an anti-twist protection,
FIG. 4 shows the section IV-IV according to FIG. 3,
and
FIG. 5 shows the section V-V according to FIG. 1.

DETAILED DESCRIPTION OF THE INVENTION

Figure 1:
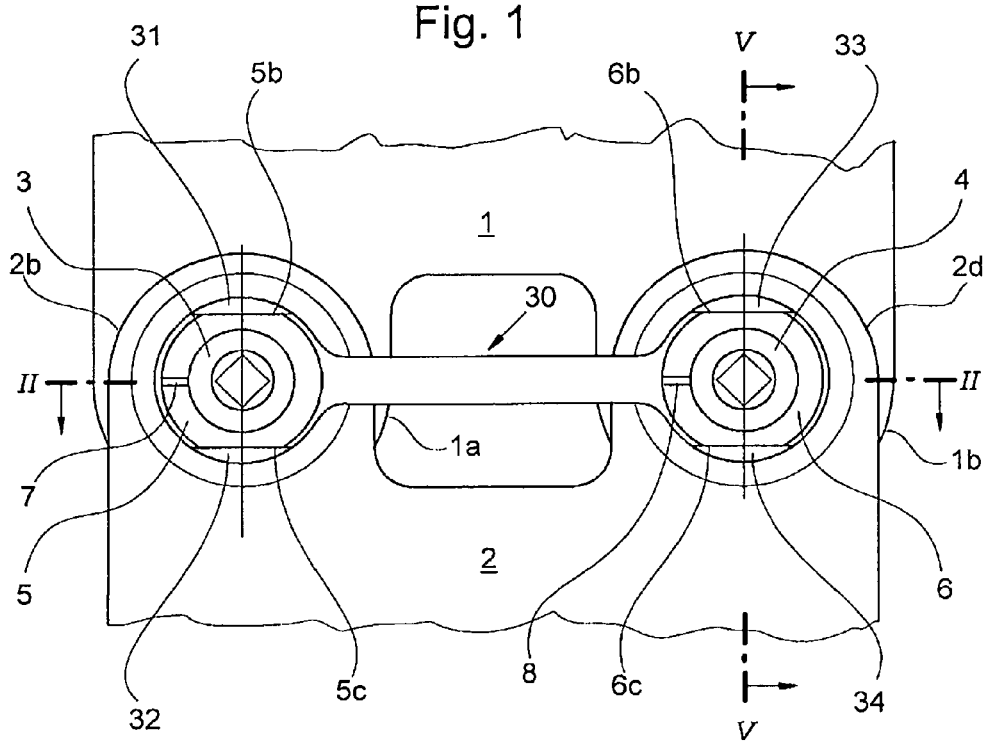
FIG. 1 shows a view of a bolted joint.
Figure 2:
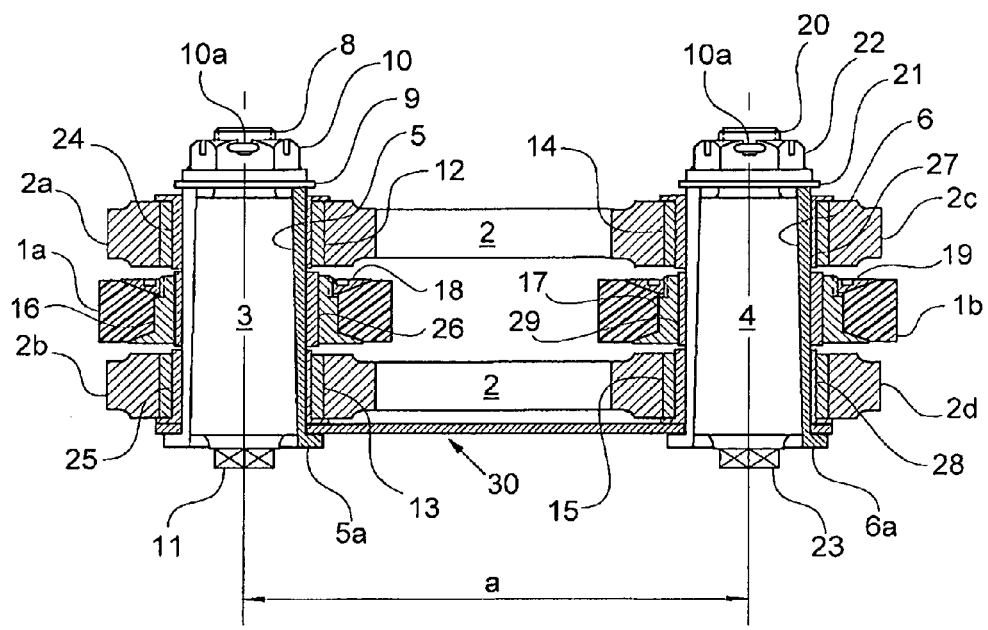
FIG. 2 shows the section II-II according to FIG. 1.

FIGS. 1 and 2 show a structural part 1 and a structural part 2, which are connected to each other in double-shear construction by two bolts 3 and 4. The structural part 1 is here adjoined in the downward direction by two bolt eyes 1a and 1b. The structural part 2 has two forks, which are respectively formed by two fork eyes 2a, 2b and 2c, 2d. Into the fork eyes 2a, 2b and 2c, 2d are pressed reinforcement bushings 12, 13, 14, 15. Since the structural part 1, in the shown illustrative embodiment, consists of fibre-reinforced plastic, so-called screw bushings 16, 17 with corresponding nuts 18, 19 are inserted for reinforcement purposes into the particular bolt eyes 1a, 1b.

The bolts 3 and 4 are conically configured and are respectively surrounded by a slotted cylindrical sleeve 5 and 6 with conical inner surface. The sleeves 5, 6 each have a rim 5a, 6a, which is respectively provided with two flattenings 5b, 5c, 6b, 6c. The position of the slots 7 and 8 is shown by FIG. 1. Each bolt 3, 4 is provided at its thin end with a threaded journal 8, 20 for tensioning purposes and at its thick end with a spanner lug 11, 23. In the assembled state, each bolt 3, 4 is fastened by means of a nut 10, 22 after a washer 9, 21 has been placed underneath.

The structural parts 1 and 2 are produced separately, the bores having already been brought to finished size. Due to this procedure, the spacings of the bores for receiving the bolts of both structural parts are not exactly consistent with one another due to production engineering inaccuracies, so that the bores of the structural part 1 have an offset relative to those of the structural part 2.

In order to produce the bolted joint with the required precision and load-bearing capacity, however, eccentric bushings 24, 25, 26, 27, 28 and 29 are provided. These bushings are slotted like the sleeves 5, 6 and bear with their inner surfaces against the outer surfaces of the said sleeves. With their outer surfaces, the eccentric bushings 24 to 29 bear against the respective reinforcement bushings of the bolt eyes 1a, 1b of the structural part 1 and the fork eyes 2a, 2b, 2c, 2d of the structural part 2.

The distance apart a of the bolts 3 and 4, measured on the finished bolted joint, is of no fixed value, but rather it derives from the production tolerances of the structural parts 1 and 2 and from the settings of the individual eccentric bushings 24, 25, 26 and 27, 28 and 29. The distance a can therefore range between a maximum value $a_{max}$ and a minimum value $a_{min}$.

An anti-twist protection 30 serves to ensure that the sleeves 5, 6 cannot twist during operation. To this end, the rims 5a, 6a of the sleeves 5, 6 are respectively provided with two diametrically opposing, mutually parallel flattenings 5b, 5c and 6b, 6c. Correspondingly, the anti-twist protection 30 has four bearing edges 31, 32, 33, 34, which bear against the flattenings 5b, 5c and 6b, 6c of the sleeves 5, 6 and thus prevent twisting of the sleeves.

FIG. 3 shows the anti-twist protection 30. This element, having an axis of symmetry s, essentially comprises two rings 35, 36, which are congruent in terms of their shape and which are connected to each other via a web 37. These rings 35, 36 here respectively have an approximately circular inner contour 38 and 39, whereof merely the diameters D perpendicular to the axis of symmetry s correspond to the outer diameters of the sleeves 5, 6.

Those diameters of the inner contours 38, 39 which are parallel to the axis of symmetry s have the measure D plus a predetermined addition x, i.e. D+x, so that the respective inner contour 38 and 39 forms a long hole. The effect of this is that the anti-twist protection 30 can be fitted within the framework of all production tolerances which are practically possible for the bolt spacings.

FIG. 4 shows the section IV-IV according to FIG. 3 through the anti-twist protection 30 at the ring 36, with the bearing edges 33 and 34.

FIG. 5 shows the section V-V according to FIG. 1 with the structural part 1, the structural part 2, the bolt 4 with the threaded journal 20, the washer 21 and the nut 22. Due to the bolt eyes 2c, 2d, the fork shape of the structural part 2 is evident. The diagram additionally shows the internally conical sleeve 6 with the rim 6a and the flattenings 6b and 6c. The diagram further shows the anti-rotation protection 30 with the ring 36 and the bearing edges 33, 34. The section is run through the bearing edges 33, 34 and shows that these interact positively with the flattenings 6b and 6c of the sleeve 6 and thus prevent a twisting of the sleeve 6.

The bolted joint is assembled as follows. First of all, in the pre-assembly, all reinforcement bushings 12, 13, 16, 14, 15, 17 are pressed or screwed into the corresponding bolt eyes 1a, 1b, 2a, 2b, 2c, 2d and their inner diameters brought to finished size. The structural parts 1 and 2 are then put together in the final assembly. Here, to begin with, the individual eccentric bushings 24, 25, 26, 27, 28, 29 are inserted into the corresponding eyes of the structural parts 1 and 2. The structural parts 1 and 2 and the anti-twist protection 30 are then brought into position.

For the insertion of the bolts, starting, for example, with bolt 3, the bushings 25, 26, 24 must first be rotated in this order such that the axes of their inner surfaces coincide. In this setting of the bushings, the bolt 3 which establishes the joint can be inserted with the sleeve 5 into the eyes 2b, 1a, 2a. Care should here be taken to ensure that the bearing edges 31, 32 of the anti-twist protection 30 embrace the flattenings 5b, 5c of the sleeve 5. Then the bolt 3 is fixed in its position by means of the washer 9 and the nut 10. Next, the eccentric bushings 28, 29, 27 are also rotated such that, here too, the axes of their inner surfaces coincide. The bolt 4 can thus also be inserted with the sleeve 6 into the particular eyes. In this case also, care should be taken to ensure that the sleeve 6 enters into engagement with the anti-twist protection 30.

After this, the bolt 4 is secured with the washer 21 and the nut 22. As the final work steps, the uniform tensioning of the bolts 3, 4 and the securement of the nuts 10, 22 by cotter pins 10a are realised. The tensioning of the bolts 3, 4 has the effect that a radial force is exerted by the sleeves 5, 6 upon the slotted eccentric bushings 24, 25, 26, 27, 28, 29, which, for their part, bear firmly against the inner surfaces of the particular eyes. This produces a play-free non-positive connection for each bolt 3, 4. The use of reinforcement bushings is not absolutely necessary. Rather, it derives from the present load conditions and the known strength characteristics of the materials used.

The previously described solution featuring eccentric bolts is not limited to cases comprising two bolts. Bolted joints with more than two bolts are also conceivable. It is further conceivable for the axes of adjacent bolts to have different directions. It is additionally conceivable for the inventive principle of the eccentric bushings also to be applied to single-shear or multi-shear bolted joints. In order to prevent a twisting of the eccentric bushings, technically standard means such as suitable feather keys or screws can be introduced after the tensioning.

What is claimed is:

1. A bolted joint comprising:
a pair of load-transferring structural parts;
wherein at least two bolt eyes are formed in each of the structural parts, and wherein each of the at least two bolt eyes of one of the structural parts is substantially aligned with a respective one of the at least two bolt eyes of the other structural parts;
wherein a slotted eccentric bushing is inserted into each bolt eye of each structural part, and wherein the bushings are adjustable by rotation such that axes of inner bores of the bushings in one of the structural parts coincide with axes of inner bores of the bushings in the aligned bolt eyes of the other structural part;
wherein a slotted sleeve is inserted through each pair of the aligned bolt eyes of the structural parts, through the inner bores of the bushings, each of the slotted sleeves comprising a conical inner surface, a cylindrical outer surface, and a rim projecting radially outwardly of the cylindrical outer surface, wherein each rim is provided with two diametrically opposing, mutually parallel flattenings;
wherein a bolt is inserted through each pair of the aligned bolt eyes of the structural parts, through the slotted sleeve, each bolt comprising a conical shaft, a threaded journal at a thin end of the shaft, and a spanner lug at a thick end of the shaft;
wherein each threaded journal engages with a nut in such a way that, when the nut is tightened on the threaded journal, the conical shaft of the bolt engages the conical inner surface of the sleeve, thereby exerting a radial force upon the bolt eyes;
wherein an anti-twist protection comprises two rings connected to each other via a web, wherein each of the rings has an opening therethrough, each opening comprising two bearing edges, wherein the bearing edges engage with the flattenings on the rims of adjacent slotted sleeves to prevent relative rotation between the adjacent slotted sleeves.

2. A bolted joint according to claim 1, wherein the anti-twist protection has an axis of symmetry extending through a center of the two rings and the openings in the rings have a diameter parallel to the axis of symmetry that is greater than a diameter perpendicular to the axis of symmetry.

3. A bolted joint according to claim 1, wherein the anti-twist protection has an axis of symmetry extending through a center of the two rings and the openings in the rings have a diameter perpendicular to the axis of symmetry which corresponds to a diameter of the cylindrical outer surface of the sleeve.

4. A bolted joint according to claim 1, wherein the rings of the anti-twist protection have a respective inner contour which is circular or forms a hole.

\* \* \* \* \*